United States Patent [19]

Takashino

[11] 3,946,436
[45] Mar. 23, 1976

[54] AUTOMATIC SHUTOFF MECHANISM FOR MAGNETIC TAPE RECORDING AND REPRODUCING APPARATUS

[75] Inventor: Shizuo Takashino, Ichikawa, Japan

[73] Assignee: Sony Corporation, Tokyo, Japan

[22] Filed: Aug. 6, 1974

[21] Appl. No.: 495,297

[52] U.S. Cl. .................................. 360/74; 242/191
[51] Int. Cl.² G11B 15/24; B65H 59/38; G03B 1/02
[58] Field of Search ............... 360/74; 242/191, 201

[56] References Cited
UNITED STATES PATENTS

| | | | |
|---|---|---|---|
| 3,637,163 | 1/1972 | Apitz | 242/191 |
| 3,779,498 | 12/1973 | Takashino | 360/74 |

Primary Examiner—Robert S. Tupper
Attorney, Agent, or Firm—Lewis H. Eslinger; Alvin Sinderbrand

[57] ABSTRACT

An improved apparatus for recording and/or reproducing signals on a magnetic tape adapted to be wound on supply and take up reels of a tape cassette which are rotationally coupled with respective reel support members of the apparatus. The reel support members are selectively urged through a drive transmission to rotate in the direction for winding tape on the respective tape reels upon the manual actuation of a control for causing operation of a reel drive. A shut off device is provided which is powered by the reel drive and is conditioned in response to the arresting of the rotation of the reel support members, for example when the tape is fully unwound from one of the reels, while operation of the reel drive continues, in order to cause the control to halt operation of the drive by de-energization of an electric motor thereof. The de-energization is achieved by the release of a latch mechanism holding actuating members for the apparatus in an operative condition, by means of a latch release operating assembly having an oscillating member normally moving between two limited positions during operation of the apparatus and driven by the drive means to an extreme position to release the latch upon arresting of the rotation of one of the reel support members. The device, in one embodiment, includes an assembly responsive to the actuating controls of the apparatus for preventing the shut off device from halting operation of the drive when the controls of the apparatus are actuated to cause rewinding of tape onto the supply reel of the cassette during the play mode of the apparatus for the purpose allowing signal review, so that the tape can be fully rewound during the review mode without halting the operation of the drive.

13 Claims, 12 Drawing Figures

AUTOMATIC SHUTOFF MECHANISM FOR MAGNETIC TAPE RECORDING AND REPRODUCING APPARATUS

The present invention relates generally to magnetic tape recording and/or reproducing apparatus, and more particularly is directed to the provision of such an apparatus with an improved automatic shut off mechanism.

With the recent advanced development of magnetic tape cassettes, the development of low cost and easily operated recording and/or reproducing apparatus for using such cassettes has become desirable. Such apparatus must be capable of performing all of the tape driving functions required for the recording and reproducing operations. In devices intended for home entertainment purposes, the apparatus must be simply controllable to provide for advancement or forward movement of the tape at a relatively slow speed during the recording and reproducing operations while also providing for the relatively fast reeling of the tape in either the forward or reverse directions to permit rapid rewinding thereof, or to permit the rapid location of a desired portion of the tape on which signals are to be reproduced or recorded. In addition, it has been found desirable in many cases to allow review of signals on a tape immediately after they have been played, while maintaining the apparatus in condition to continue playing or listening to signals on the tape.

Magnetic tape cassettes have the tape wound on supply and take up reels which are confined within the cassette housing, so that it is therefore imperative that the drive of the tape and of the reels be stopped upon the full unwinding of the tape from either of the reels during any of the operating modes of the apparatus in order to avoid the possibility that an end of the tape will be removed or detached from one of the reels within the cassette. If an end of a tape becomes detached from a reel the cassette housing obviously must be taken apart to permit rethreading of the tape within the guides provided therefore within the cassette and connection of the tape end to the reel from which it has become detached. This is highly undesirable and sacrifices the advantages inherent in cassette type tape recording and reproducing apparatus.

A number of various mechanical arrangements have been previously proposed for automatically halting the drive of the tape and reels within a cassette upon the full unwinding of tape from either of the reels. A number of such prior systems and their inherent disadvantages are discussed in U.S. Pat. No. 3,779,498, which patent also discloses a device for halting operation of a recording and reproducing apparatus upon full unwinding of the tape from either of the reels of the cassette.

It is an object of the present invention to overcome the disadvantages of such previously proposed structures, and to provide a recording and reproducing apparatus intended for use with conventional or standardized tape cassettes having an improved device by which the operation of the tape drive is automatically halted when the tape is fully unwound from either of the reels within the cassette.

Another object of the present invention is to provide a recording and reproducing apparatus for use with conventional tape cassettes, which allows review of signals on the tape during the play mode of operation and which will automatically halt the operation of the tape drive when tape is fully unwound from either of the reels within the cassette in all modes of operation of the device, but not during the review mode thereof.

Another object of the present invention is to provide a recording and reproducing apparatus of the character described which is conveniently and safely operated by the general public, and in which the tape drive is automatically halted upon the full unwinding of the tape from either of the reels within a cassette during any of the operating modes of the apparatus, particularly during normal forward movement for recording and reproducing operations as well as during the fast rewinding or fast forward advancement of the tape; but not during the review mode of operation thereof.

Another object of the present invention is to provide an improved magnetic recording and/or reproducing apparatus for use with tape cassettes which has pushbutton controls for selecting the various operating modes of the apparatus and wherein such controls are operatively associated with the drive by which the operation of the tape drive, for any of the selected modes, is automatically halted upon the full unwinding of the tape from either of the reels.

Still another object of the invention is to provide a magnetic recording and reproducing apparatus with an automatic shut off device of the character described which is relatively simple and inexpensive to produce and capable of reliable operation.

In accordance witht an aspect of this invention, an apparatus for recording and reproducing signals on a magnetic tape extending between two reels to which the ends of the tape are secured and on which the tape is wound, for example within a tape cassette, comprises a pair of rotatable reel support members for rotational coupling with the respective reels of the casssette. Drive means, including an electric motor, operate the reel support members and is controlled by a drive control means including a switch having a normal inoperative condition and actuable to an operative condition for energizing the motor and thereby affecting the operation of the drive means. A plurality of manually actuable pushbuttons or the like are movable from normal inoperative positions to operative positions for actuating the switch means to the operative condition thereof for turning on the motor. A latch is releasably associated with the actuating pushbuttons to hold the pushbuttons in their operative positions.

A transmission is provided within the apparatus which is responsive to the drive control means for urging a selected one of the reel support members to rotate in the direction for winding tape on the reel respectively coupled therewith and for permitting continued operation of the drive means when rotation of the reel support members is arrested upon the full unwinding of the tape from one of the reels. A shut off device within the apparatus serves to return the apparatus to its inoperative state upon full unwinding of the tape in substantially all modes of operation thereof and includes a latch release means which is displaceable to a predetermined extent for releasing the latch. The latch release means is controlled by a latch release operating means that is movable between a first inoperative position and a second operative position in operative driven engagement with the drive means in order to be driven by the drive means for displacing the latch release means to said predetermined extent only when the rotation of the reel support members is arrested during the continued operation of the drive means. The latch release operating means is selectively moved from its inoperative to its operative position by an assembly which includes a lever pivotally mounted in the apparatus and having one end positioned adjacent the latch release operating means and being normally biased to a position where its one end is against the latch release operating means and at which the latter is held in its operative position. This assembly includes means driven by the drive means for oscillating the lever against said bias between said first position and a second position wherein the one end of the lever is out of engagement with the latch release operating means. Stop means are operatively engaged with one of the reel support members to limit oscillation of the lever, during rotation of the reel support member to which it is engaged, to movement between the second position of the lever and an intermediate position at which the one end of the lever is adjacent to but out of engagement with the latch release operating means. This stop means includes means for releasing the lever for movement to its first position by the means which biases it to that position when the rotation of the one reel support member to which the stop means is engaged is arrested, thereby to move the latch release operating means to its second position for displacing the latch release means to said predetermined extent.

As an additional feature of the apparatus of the present invention, the shut off control means can include means which is responsive to the drive control means for preventing movement of said latch release means to said predetermined extent when the drive control means is actuated to cause the transmission to rewind tape onto the supply reel of the cassette during the play mode of the apparatus in order to permit review of signals on the tape, so that the tape can be fully rewound during the play mode without halting the operation of the drive means.

The above, and other objects, features and advantages of this invention, will be apparent from the following detailed description of an illustrative embodiment thereof which is to be read in connection with the accompanying drawings, wherein.

Figure 1:
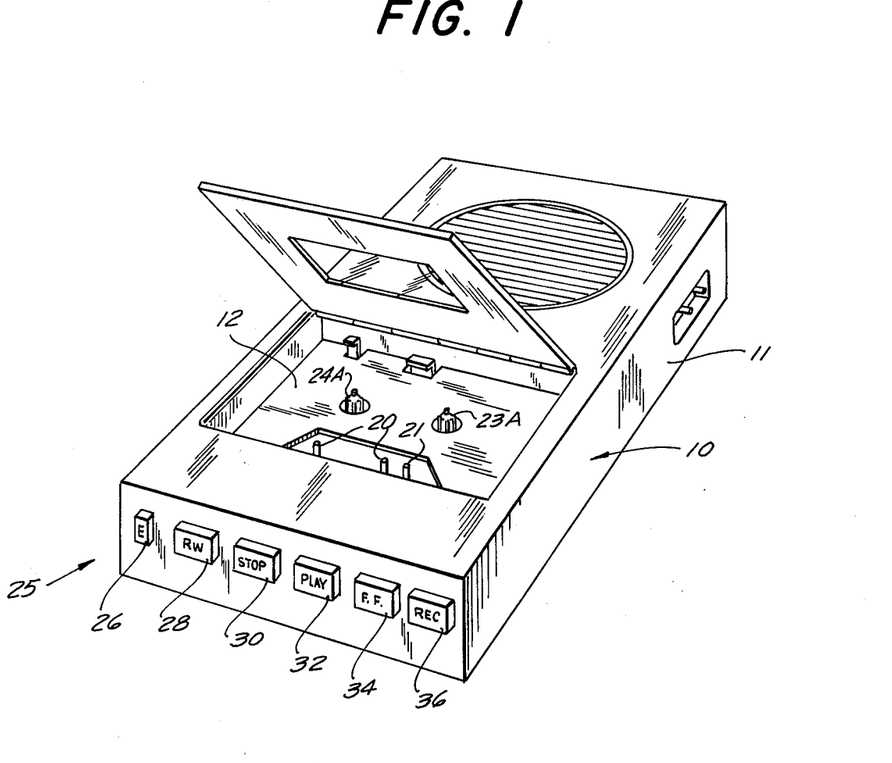
FIG. 1 is a perspective view of a magnetic recording and reproducing apparatus of the type that may be provided with an automatic shut off device according to the present invention.
Figure 2:
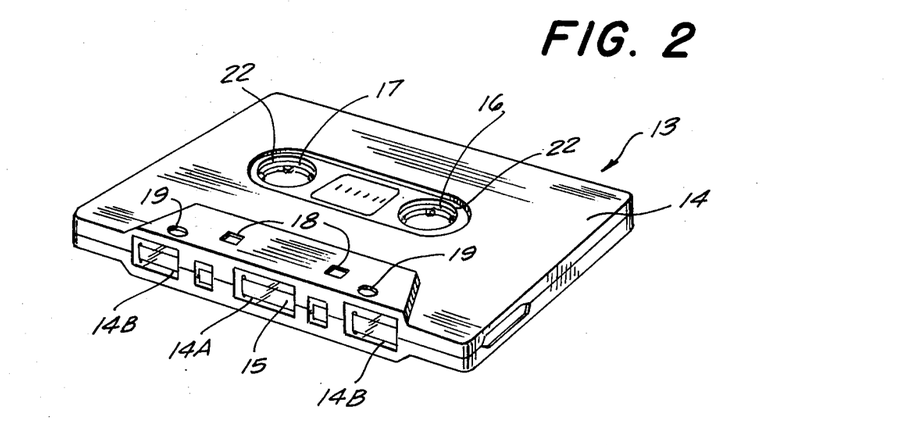
FIG. 2 is a perspective view of a conventional or standardized tape cassette adapted to be employed with the apparatus of FIG. 1.

Referring now to the drawing in detail, and initially to FIG. 1 thereof, it will be seen that a magnetic recording and reproducing apparatus 10 of a type that may be provided with an automatic tape drive shut off device according to this invention includes a casing 11 provided with a recess or cavity 12 for reception of a tape cassette 13 (FIG. 2).

Cassette 13 is of conventional construction and includes a housing 14 containing a tape 15 wound on reels 16 and 17 that are freely rotatable within the housing. As is usually the case, the opposite ends of the tape are secured to the reels 16 and 17 with the tape extending between the reels directed by guides (not shown) in the cassette housing so as to travel along the front edge wall of the cassette for exposure at openings or windows 14A and 14B provided in the front edge wall. The top and bottom walls of cassette housing 14 are provided, adjacent the front edge of the housing, with a pair of laterally spaced openings 18 and a pair of further laterally spaced apart openings 19. When the cassette 13 is disposed in cavity 12 of casing 11, locating pins 20 projecting upwardly within the cavity are received in openings 18 of the cassette for precisely locating the latter; and a capstan 21, also projecting upwardly within cavity 12, extends into one or the other of the openings 19 of the cassette and is thus disposed adjacent the portion of magnetic tape 15 passing one of the windows 14B in the front edge of the cassette.

The top and bottom walls of cassette housing 14 are further shown to have the usual openings 22 registering with internally spleened hubs of reels 16 and 17 so that when the cassette is disposed in cavity 12, such internally spleened hubs can receive and be rotatably coupled with the similarly spleened rotatable wheel drive shafts 23A, 24A of reel support members 23 and 24 (FIG. 3), which drive shafts project upwardly into cavity 12.

The apparatus 10 includes a control assembly 25 having pushbuttons 26, 28, 30, 32, 34 and 36 that are manually actuable to select respective operating modes of apparatus 10. For example, when the cassette 13 is located within cavity 12, manual depression of pushbutton 28 may be made effective to cause rewinding of the tape in a reverse direction, i.e. in the direction from the take up reel 16 to the supply reel 17 of the cassette. Similarly, depression of pushbutton 32 may be made effective to control the normal or relatively slow speed advancement of the tape 15 in the forward direction, i.e. from tape supply reel 17 to the take up reel 16, as during the play back or reproducing of signals previously recorded on the tape, or during the recording of signals on the tape during the recording mode which is achieved by the simultaneous actuation of pushbuttons 32 and 36. Operation of pushbutton 34 may be made effective to control the fast forward movement of the tape from supply reel 17 to take up reel 16 and the pushbutton 30 may be employed for halting the tape drive at any desired time during any of the selected operating modes of apparatus 10. Finally, the pushbutton 26 may be effective in the conventional manner as an eject button for ejecting the tape cassette 13 from cavity 12 to permit changing of cassettes.

Figure 3:
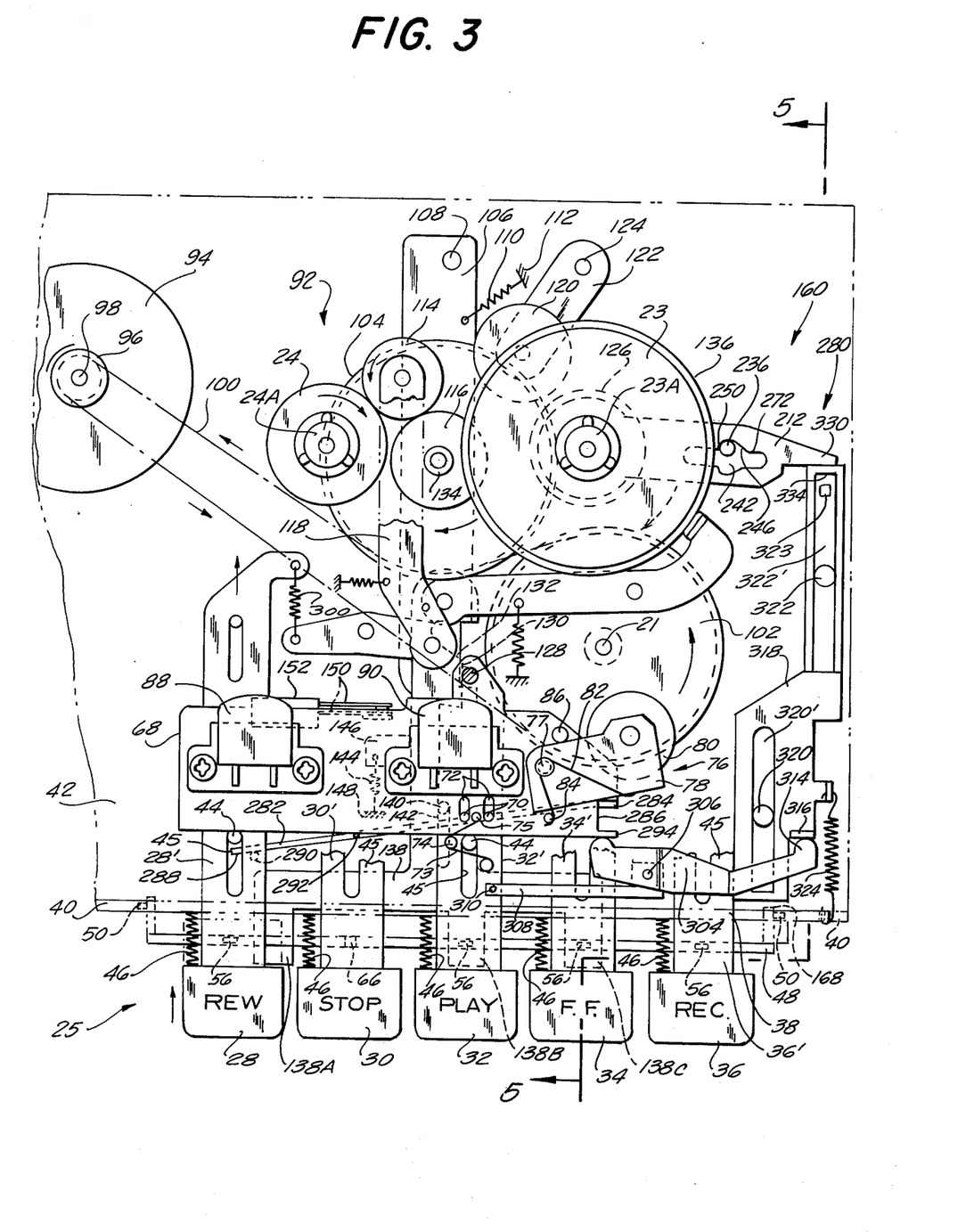
FIG. 3 is an enlarged plan view of the apparatus of FIG. 1, with parts removed and parts broken away or shown in dotted lines, for clarity.

The control assembly, drive and transmission of the apparatus 10 illustrated in FIGS. 1-3, is substantially identical to the control assembly drive and transmission of the magnetic tape recording and reproducing apparatus described in U.S. Pat. application Ser. No. 491,064, filed July 23, 1974 (identified as Curtis, Morris & Safford, P.C. File No. *SO* 549), the disclosure of which is incorporated herein by reference. Accordingly, the operation and detailed mechanism of the control assembly will not be described herein in detail, but rather reference is made to said co-pending U.S. application for such detailed description of the operation and actuation of the apparatus. Only the details of the control assembly necessary to an understanding of the present invention will be described herein, for the sake of brevity.

Figure 5:
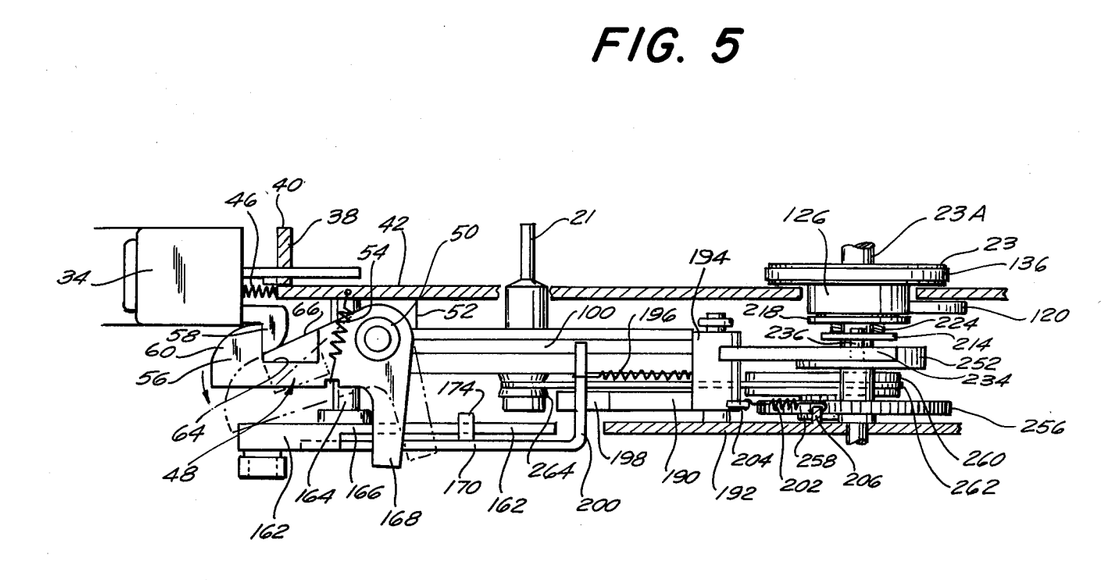
FIG. 5 is a side elevational view taken along lines 5—5 in FIGS. 3 and 4.

Referring to FIGS. 3 and 5 of the drawing, it will be seen that the mode selecting pushbuttons 28–36 include actuator bars 28'–36' respectively secured thereto and slidably mounted through slots 38 in the upstanding forward flange 40 of a chassis plate 42. The pushbuttons are guided for linear movement towards and away from the flange 40, between operative and inoperative positions, by means of guide pins 44 extending upwardly from the top surface of chassis plate 42 through slots 45 in the actuator bars. The pushbuttons are biased to their outer inoperative positions by springs 46 respectively engaged between the pushbuttons and the chassis plate.

Control assembly 25 includes a latch member 48 which is pivotally mounted at its ends, for example by pivot pins 50 on brackets 52 (FIG. 5) or the like depending downwardly from chassis plate 42. A spring 54 is connected between the latch member 48 and a tab provided on the chassis plate 42 for urging the latch member in a clockwise direction (as seen in FIG. 5) to its latching position. The latching position of latch member 48 is limited by a stop (not shown) on the latch member which will engage against the lower surface of chassis plate 42 to limit clockwise rotation thereof under the influence of spring 54.

Latch member 48 is formed with laterally spaced apart keepers or abutment members 56 which respectively register with pushbuttons 28, 32, 34 and 36 and which are adapted to receive latch elements 58 depending from the respective pushbutton, at the rear thereof; when the pushbutton is manually displaced or depressed to its operative inward position, shown in solid lines in FIG. 5 and dotted lines in FIG. 3, with respect to the pushbutton 34. It will be apparent that, as any one of the pushbuttons 28, 32, 34 or 36 is depressed or moved towards the right in FIG. 5 to its operative position, its respective latch element 58 rides on the forward surface 60 of the keeper element 56 associated therewith to depress or pivot the latch member 48 downwardly in a generally counterclockwise direction as indicated by the arrow 62 in FIG. 5, against the force of spring 54 until such time as the latch element 58 is received behind the keeper in the slot 64. When this occurs the spring 54 returns the latch member 48 to its solid line position, illustrated in FIG. 5, so that the keeper 56 holds the depressed pushbutton in its operative position until such time as the latch member is rocked to its released position, indicated by broken lines in FIG. 5, whereupon any previously depressed pushbutton is freed to be returned to its inoperative position by the respective spring 46 associated therewith.

At the location of the stop pushbutton 30, the latch member 48 has an upwardly inclined ramp 66 formed therein, partially seen in the side view of FIG. 5 (beyond the keeper 56 associated with the fast forward button 34) which is engageable by the latch element 58 of the stop pushbutton 30, but which does not form a keeper or a slot in which the latch element 58 of stop pushbutton 30 can be captured. Thus, whenever the stop pushbutton 30 is depressed to its inner position, the latch element 58 thereof engages the ramp 66 of latch member 48 to depress the latch member to its release position, indicated at dotted lines in FIG. 5, thereby to release the latch element 58 of any one of the other pushbuttons 28, 32, 34 or 36 which had been previously retained in the operative position thereof.

Referring again to FIG. 3 of the drawing, it will be seen that the apparatus 10 further includes a carriage 68 which is disposed above the chassis plate 42 and mounted for forward and rearward movement with respect to the latter on the actuator bar 32' of the play pushbutton 32. The carriage 68 is movably supported on the play pushbutton, for reasons more fully described hereinafter, as for example by means of pins 70 extending upwardly from the actuator bar 32' and received in slots 72 formed in the carriage member. The latter is normally urged in the forward direction with respect to actuator bar 32' so that pins 70 engage the rear of slots 72, by means of a torsion spring 73 mounted on a post 74 extending upwardly from carriage actuator bar 32 and engaged between the actuator bar and a pin 75 extending upwardly from the carriage.

A pinch roller assembly 76 is pivotally mounted on a post 77 extending upwardly from carriage 68.

The pinch roller assembly includes a bracket 78 which rotatably supports a pinch roller 80 which cooperates with capstan 21 as described hereinafter. The bracket 78 is biased towards capstan 21 by a torsion spring 82 engaged between bracket 78 and a pin 84 on carriage 68. Pivotal movement of the bracket 78 under the influence of spring 82 is limited by a stop pin 86 extending upwardly from the carriage member.

An erasing head 88 and a recording and reproducing head 90 are secured to carriage 68 so that, when a cassette 13 is disposed in cavity 12 and carriage 68 is moved to its operative position upon depression of the pushbutton 32, the heads 88, 90 will be engaged with the tape 15 exposed at windows 14B and 14A respectively of the cassette housing. In that position, illustrated in solid lines in FIG. 8, the pinch roller 80 is pressed by spring 82 against capstan 21, through the window 14B of the cassette housing opposite to that at which erasing head 88 engages the tape, so that the tape can be advanced thereby in response to rotation of the capstan.

As shown particularly in FIG. 3, the apparatus 10 includes a drive assembly 92 having an electric motor 94 mounted below the chassis plate 42 in any convenient manner and having a drive pulley 96 secured to the motor shaft 98 for driving a belt 100 which is wrapped about the grooved periphery of a first flywheel 102 and engaged with a portion of the grooved periphery of a main drive flywheel 104. The flywheels 102, 104 are disposed below chassis plate 42 with the flywheel 102 being rotatably mounted by a bearing (not shown) on the lower surface of the chassis plate and having an integral extension which passes upwardly through an opening in the chassis plate to form the capstan 21. The main drive flywheel 104 is rotatably mounted by a bearing (not shown) on a lever 106 which is rotatably mounted by a pivot pin 108 below the chassis plate 42 and biased in a counterclockwise direction by a spring 110 connected between the lever and a tab 112 extending downwardly from the lower surface of the chassis plate. In the illustrated drive assembly, the belt 100 is arranged with respect to the grooved flywheels 102, 104 so that upon energization of motor 94, flywheel 102 is rotated in a counterclockwise direction while flywheel 104 is rotated in a clockwise direction, as viewed in FIG. 3.

The apparatus 10 further includes a transmission assembly which is described in detail in the above mentioned co-pending application, commonly assigned herewith, which transmission assembly, in accordance with the mode of operation selected by the manual actuation of the control pushbuttons 28, 32, 34 transmits rotary movement from the main drive flywheel 104 to a selected one of the reel support members 23, 24 for rotating the selected reel support member in the direction for winding tape on the reel of cassette 13 which is respectively coupled therewith. The reel support members are rotatably mounted in chassis plate 42 in any convenient manner and are located on the top surface of the chassis plate.

More specifically, for example, as described in the above mentioned patent application, in the rewind mode of operation of the device, the transmission assembly thereof holds an idler wheel 114 engaged between the periphery of the reel support member 24 and a friction drive wheel 116 mounted for rotation with the main drive flywheel 104 (or integrally formed therewith) so that rotation of the main drive flywheel is transmitted through the idler wheel 114 to rotate the reel support member 24 in a clockwise direction, as indicated by the arrows in FIG. 3 of the drawing, to rewind tape onto the cassette supply reel 17 coupled therewith. In the fast forward mode of operation of the apparatus, i.e. when pushbutton 34 is moved to its operative position, the lever 118 on which idler wheel 114 is mounted, is moved by the transmission mechanism described in said above mentioned patent application, to bring the idler wheel 114 into engagement with the auxiliary idler wheel 120, which is mounted below chassis plate 42 on a lever 122 which in turn is pivotally mounted on the chassis plate by a post 124. In this mode of operation the idler wheel 114 is engaged between the friction wheel 116 and the auxiliary idler wheel 120, and is biased towards the right in FIG. 3, so as to cause the auxiliary idler wheel 120 to engage a friction wheel 126 secured to or formed integrally with the reel support member 23 on the lower side thereof to drive reel support member 23 at a relatively high rate of speed in the fast forward mode.

Figures 4, 9:
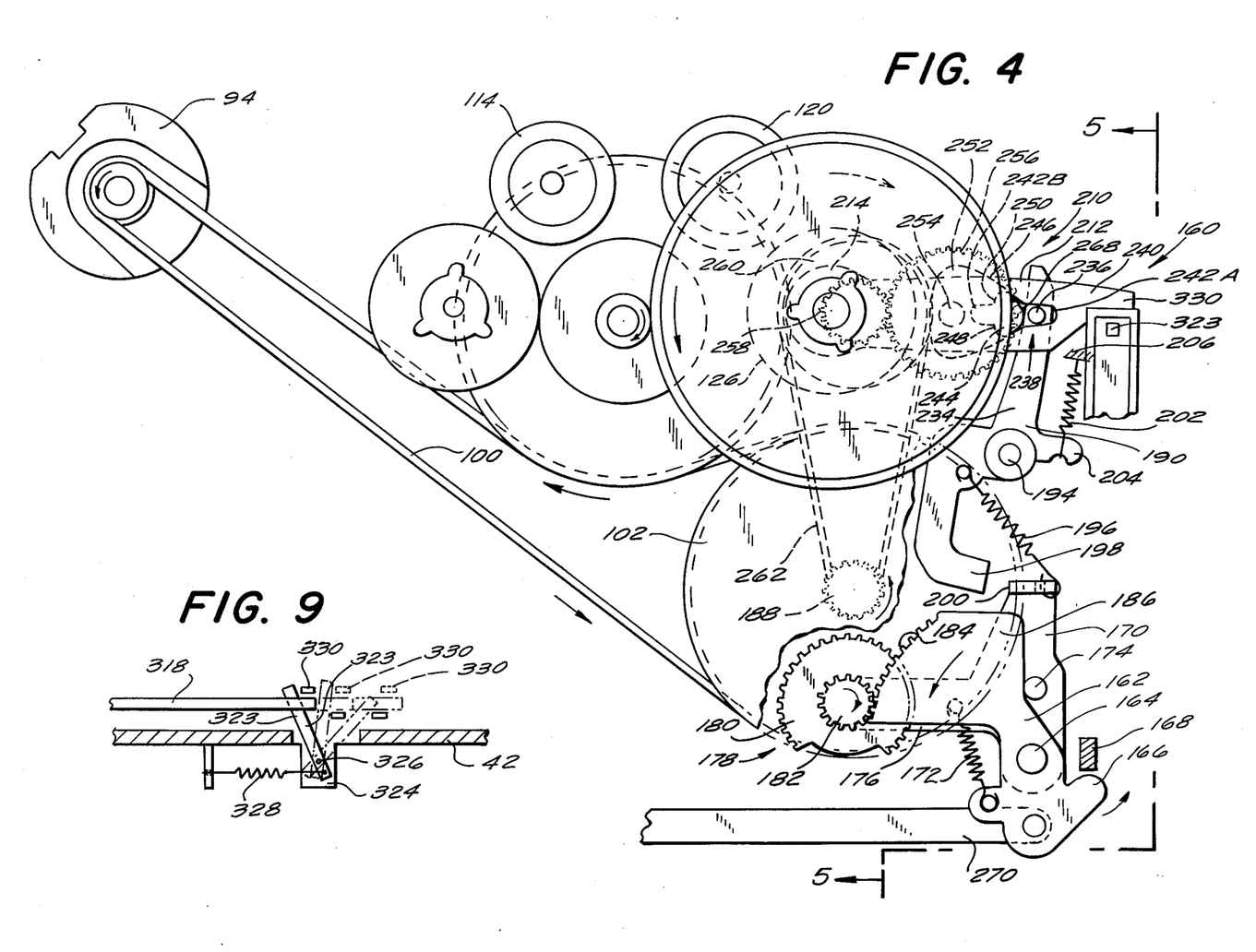
FIG. 4 is a detailed plan view of the drive and shut off control means of the apparatus shown in FIGS. 1-3.
FIG. 9 is a side elevational view taken along lines 9—9 of FIG. 8.
Figure 8:
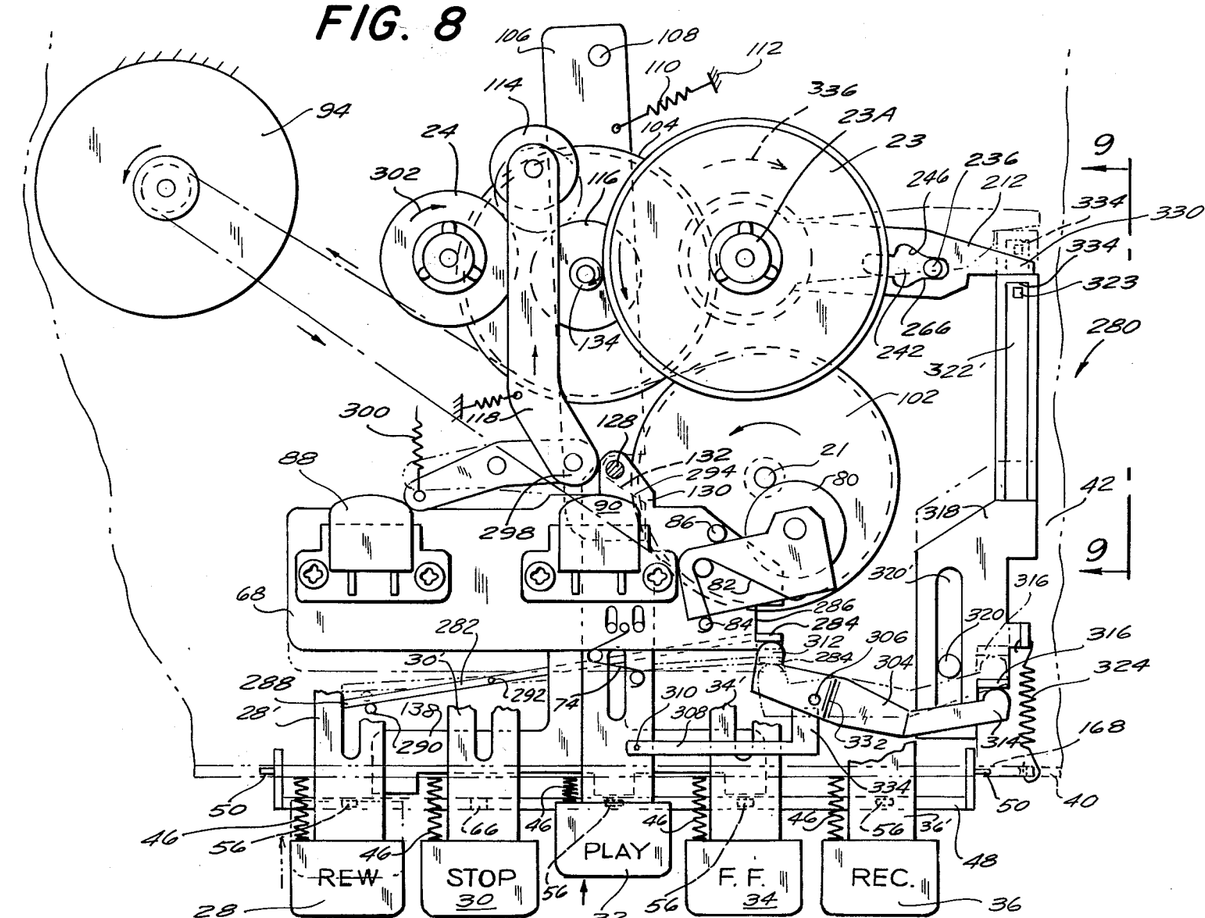
FIG. 8 is a plan view, similar to FIG. 3 showing the control assembly which prevents operation of the shut off control means during the review mode of operation of the apparatus.

In the play and record modes of the apparatus, the idler wheel 114 is moved to the position thereof illustrated in FIGS. 4 and 8, by the transmission mechanism of the apparatus, so that it is out of driving engagement with the main drive flywheel 104. Movement of the carriage 68 upon depression of the play pushbutton in either the play or record modes of operation, causes a pin 128 extending downwardly from the carriage through a slot in the chassis plate 42 to move from engagement with the edge 130 of lever 106 into a notch 132 formed in that lever. In the rewind and fast forward modes of operation, the engagement of the downwardly extending pin 128 with edge 130 of the lever 106 holds the lever against the bias of spring 110 in the position illustrated in FIG. 3. However, when the play pushbutton is depressed, causing the pin 128 to move closer to main drive flywheel 104 and thus into the notch 132, the lever 106 is free to move to the right in a counterclockwise direction in FIGS. 3 and 8, to cause a second friction wheel 134, of smaller diameter than friction wheel 116, on main flywheel 104 and above friction wheel 116, to engage the periphery 136 of the reel support member 23, to drive the latter in a counterclockwise direction, at a relatively slow speed, such as used for recording and reproducing purposes with tape cassettes. When the device is stopped or shut off in the play or record modes, the play pushbutton 32 returns to its initial position, thereby returning the pin 128 into engagement with the edge 130 of lever 106, rotating the lever in a clockwise direction to disengage the friction wheel 134 from the periphery of reel support member 23. Simultaneously, as described in the above mentioned co-pending application, the idler wheel 114 is returned to its solid line position in FIG. 3 (shown in dotted lines in FIG. 3) to act as a brake on the rotation of the reel support member 24.

For controlling the operations of the transmission assembly of the apparatus 10, a generally Y-shaped control member 138 is disposed against the underside of chassis plate 42 and is movably mounted with respect to the latter by means of a pin 140 depending from chassis plate 42 and engaged loosely in a slot 142 formed in the control member. The control member 138 includes forwardly diverging arm portions 138A, 138B and 138C which are respectively engaged with the back surfaces of the control pushbuttons 28, 32 and 34 by the action of a tension spring 144 connected between a lug or extension arm 146 on the control member 138 and an anchor or tab 148 extending downwardly from the under surface of chassis plate 42.

It will be appreciated that upon actuation of any of the control pushbuttons 28, 32, 34 from their inoperative to their operative position their associated arm portion 138A, 138B or 138C, will move rearwardly therewith thereby to move the control member 138 in a generally axial direction towards the main drive flywheel 104. As a result of this movement, the lug or extension arm 146 of the control plate engages the spring contacts 150 of a switch 152 which is operatively connected between a source of current (not shown) and the motor 94, thereby actuating the motor. Simultaneously, the transmission system of the apparatus, as described in the above-identified application, is engaged to drive the selected reel support member in the appropriate direction according to the selected mode of operation of the apparatus. Of course, when the pushbuttons are released from their operative to their inoperative positions, the control member 138 returns to the position thereof illustrated in FIG. 3, thereby releasing contact with the switch contacts 150, and shutting off the motor 94.

From the above, it will be appreciated that following the actuation of any one of the control pushbuttons 28, 32, or 34 for conditioning the transmission assembly to achieve the respective driving condition, the actuated control pushbutton will be retained in its operative position for maintaining the selected driving condition and operation of motor 94, by reason of the previously described action of the latch member 48 until such time as the latter is released, for example, by actuation of the manual stop pushbutton 30.

The actuation of the pushbutton 32 and 36 are relied on not only to condition the transmission assembly for the normal forward movement of the tape, but also are adapted to condition electrical circuits (not shown) associated with the heads 88, 90 so that the heads are operative to erase and reproduce signals respectively on the tape. When it is desired to record signals on the tape during the normal forward movement of the latter, the pushbuttons 32, 36 are simultaneously actuated to their operative positions and, in that case, the pushbutton 32 again conditions the transmission assembly for the normal forward movement of the tape while the actuated pushbutton 36 conditions the electrical circuits (not shown) associated with head 90 so that the latter is then operative to record signals on the tape.

In accordance with the present invention, the above described recording and reproducing apparatus is provided with an automatic shutoff device 160 by which the operation of motor 94 of the tape drive assembly is halted upon the full unwinding of the tape from one of the reels 16 and 17, coupled rotatably with the reel support members 23 and 24. The shutoff mechanism is shown most clearly in FIGS. 4-6 of the drawing, with parts thereof shown in FIG. 3 and others removed therein for clarity. Essentially, the shutoff mechanism includes a latch release member 162 (FIG. 4) which is pivotally mounted, in any convenient manner, as for example by a post 164, on the lower surface of chassis plate 42. The latch release member includes an abutment end portion 166 positioned adjacent a downwardly extending arm 168 (FIG. 5) of latch member 48. As seen in FIG. 5, the downwardly extending arm 168 in effect makes the latch member 48 a bell crank; thus when the latch release member 162 is oscillated to engage its abutment arm 166 against the depending leg 168 of the latch, and moved rearwardly, or to the right in FIG. 5, it will pivot the latch 48 downwardly to the dotted line position thereof shown in FIG. 5 to release any pushbutton then held in its operative position.

Figure 6:
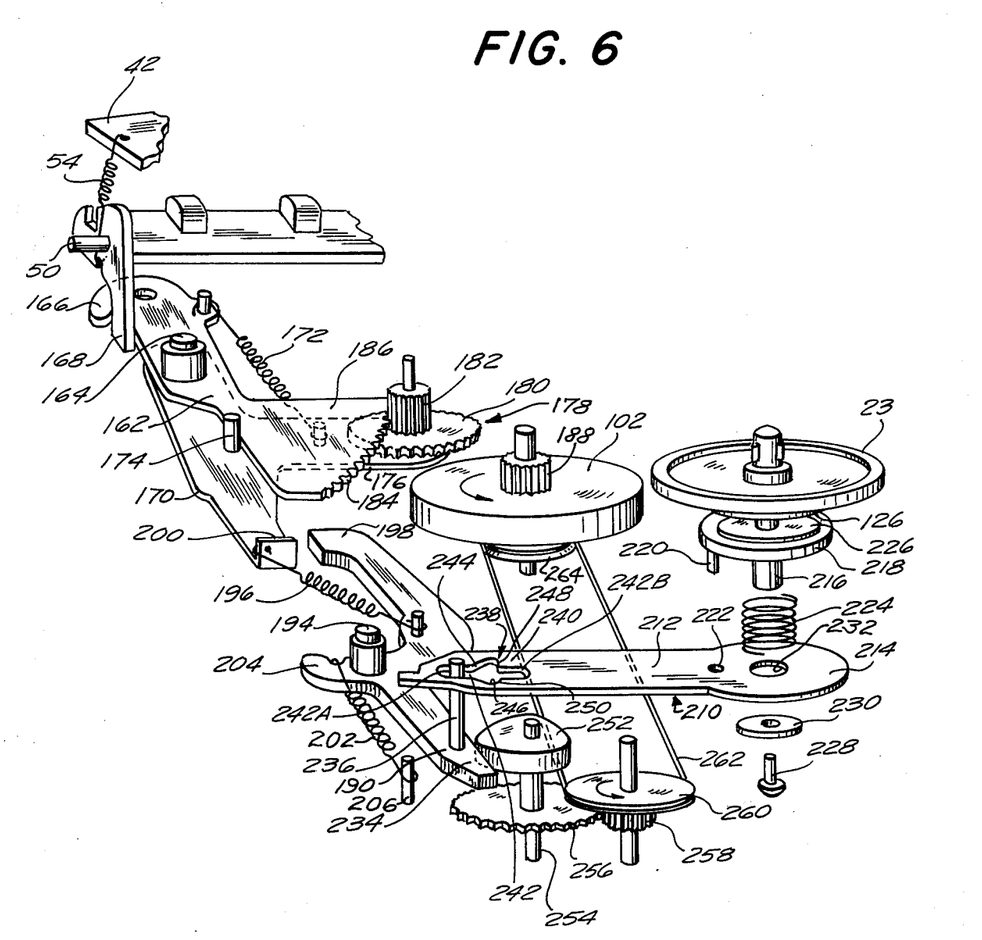
FIG. 6 is a perspective view of the shut off control means of the present invention.

The movement of the latch release member 162 is controlled by a latch release operating member 170 which is also pivotally mounted on post 164, with the latch release member 162, but it is located below the latch release member, as illustrated most clearly in the perspective view of FIG. 6. The latch release control member 170 is operatively connected to the latch release member 162 by a spring 172. A stop member 174 limits relative rotation between members 162 and 170 under the influence of spring 172 so that the two elements normally remain in the relative position illustrated in FIG. 4, but relative pivotal movement therebetween is permitted against the bias of spring 172, as described hereinafter.

The latch release control member 170 includes an arm portion 176 on which a compound spur gear 178 is rotatably mounted. This spur gear includes a first relatively large diameter gear 180 and an integral small diameter spur gear 182. The latter is in meshing engagement with a sector-shaped gear 184 formed on the arm 186 of latch release member 162. By this arrangement, it will be appreciated that upon rotation of the gear 180, the gear 182 in engagement with sector gear 184 will cause rotation of the latch release member 162. By rotating the gear 182 in a clockwise direction, as illustrated in FIG. 4, the latch release member 162 will rotate in a counterclockwise direction, as indicated by the arrows in FIG. 4, causing the abutment arm 166 thereof to engage the depending leg 168 of the latch 48, thereby pivoting the latch and releasing the pushbuttons.

In order to selectively rotate gear 184, a spur gear 188 is provided on the flywheel 102 for rotation therewith. This gear is selectively engaged with the gear 180, as described hereinafter, to provide rotary drive thereto in order to pivot the latch release member 162 in the manner previously described.

Figure 7A:
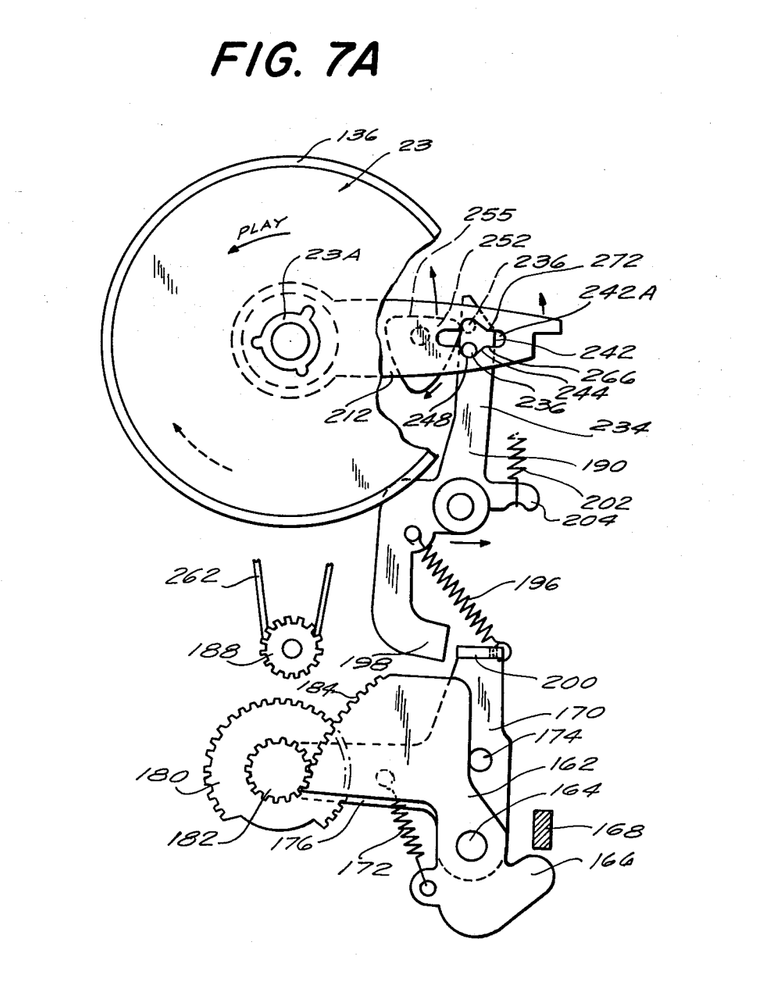
FIGS. 7A-7D are plan views illustrating the movement of the elements in the shut off control means.
Figure 7B:
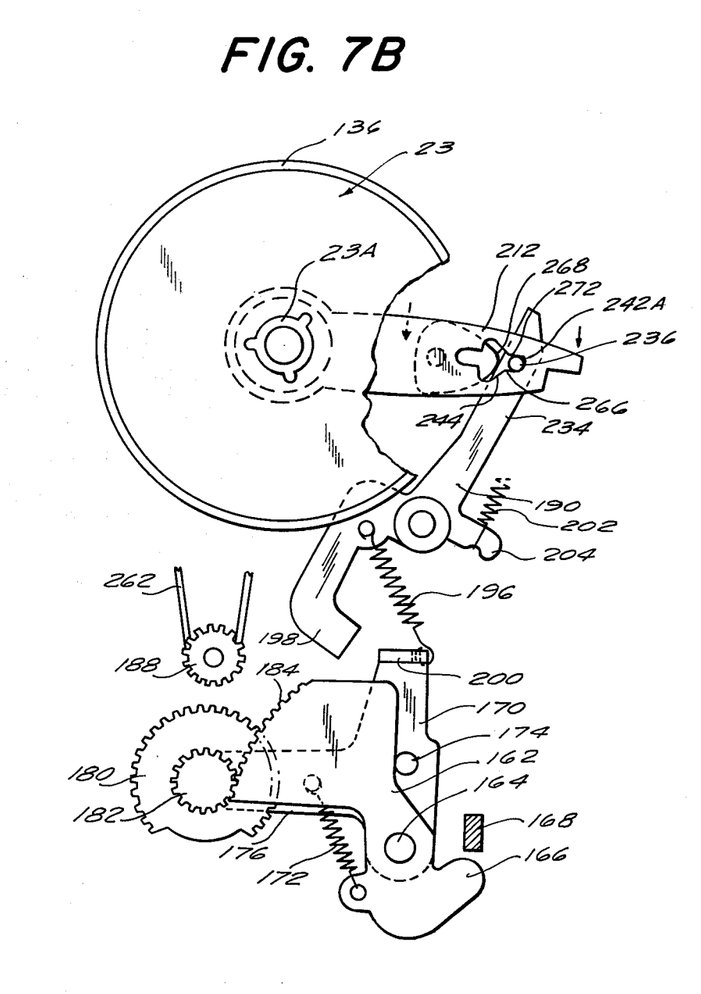
Figure 7C:
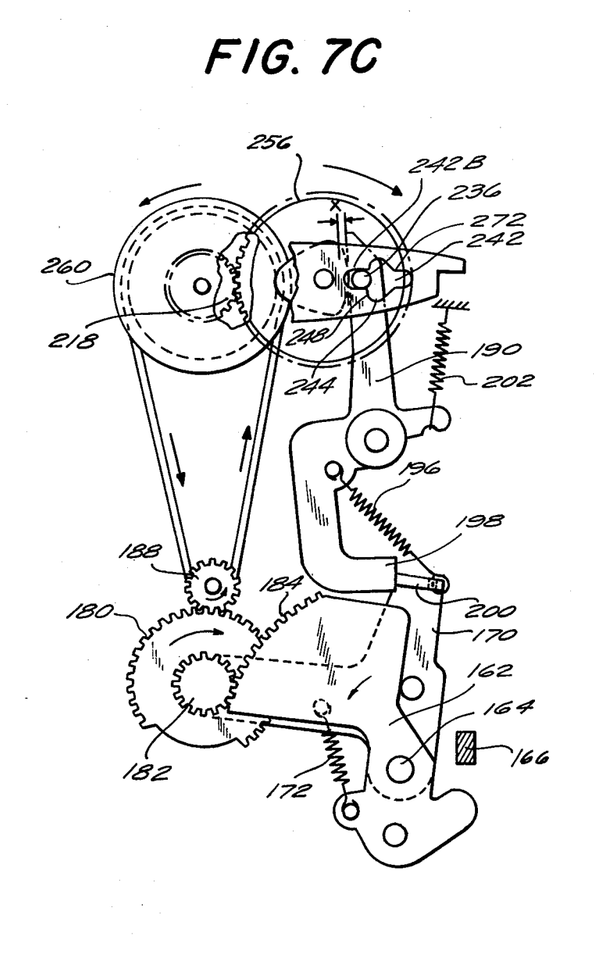
Figure 7D:
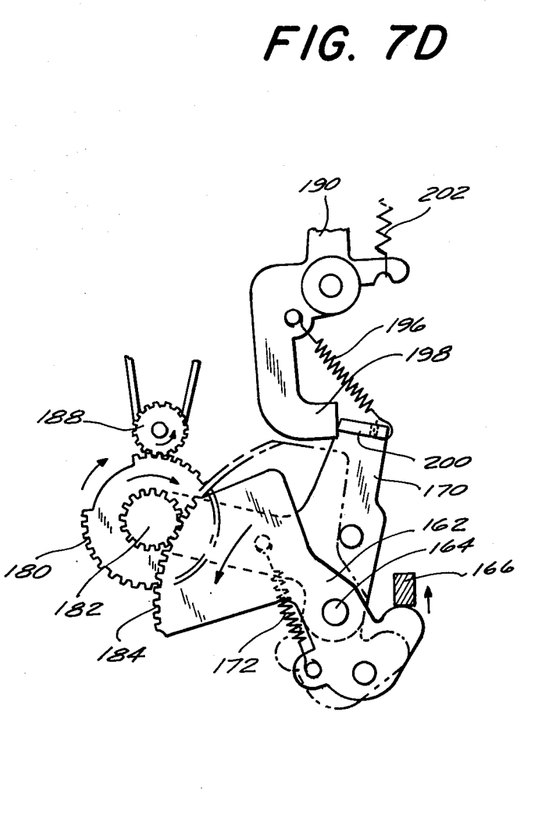

Gears 180 and 188 are selectively engaged upon pivotal movement of the latch release control member 170 from the position thereof illustrated in FIG. 4 (wherein gear 180 is spaced from gear 188), in a clockwise direction, to the position thereof illustrated in FIG. 7C. With the member 170 in the position, the engagement of gear 188 with gear 180 causes gear 182 to rotate the sector gear 184, as previously described, thereby to move latch release member 162 in a counterclockwise direction, as illustrated in FIG. 7D, to pivot the arm 168 of latch member 48, thereby to release any previously depressed pushbutton.

This pivotal movement of the member 170 is controlled by the oscillation of a lever 190, pivotally mounted on a bracket 192 secured in any convenient manner to the lower side of chassis plate 42 and spaced downwardly therefrom. Lever 190 can be mounted on plate 192 (FIG. 5) in any convenient manner as for example by an integral bearing or shaft 194. The lever is operatively connected to control member 170 by a spring 196 which serves to bias the end 198 of the lever into engagement with the end portion 200 of control member 170. A second spring 202 supplements the action of spring 196, and is connected between a crank arm 204 integrally formed with lever 190 and a tab 206 on the support bracket 192. Thus, it will be apparent that these springs normally tend to bias the lever 190 into engagement with control member 170, so as to urge the control member into a first position illustrated in FIG. 7C wherein gears 180 and 188 are engaged. However, the shutoff assembly 160 is provided with a control mechanism 210 for selectively preventing movement of the lever 190, against the bias of springs 196 and 200, into engagement with the control member 170.

The control mechanism 210 which normally prevents movement of lever 190 into engagement with control member 170 includes an elongated plate 212 which is formed with a hub 214 rotatably mounted on the shaft 216 of reel support member 23. A friction ring or clutch 218 is also rotatably mounted on shaft 216 and has a key member 220 which is received in an opening 222 in hub 214 to prevent relative rotation of the friction ring with respect to the hub. A spring 224 is positioned between the friction ring 218 and hub 214 in order to bias the frictional surface 226 of the ring into engagement with the lower side of the reel support member 23, thereby to frictionally couple hub 214 to reel support member 23, to cause the plate to rotate with the reel support member. The plate 212 is held in assembled condition with the friction ring 218 by a rivet, screw, or the like 228 (and a washer 230) which extends into the end of the shaft 216 through the central aperture 232 of hub 214 (FIG. 6).

The arm 234 of lever 190 carries an integral guide pin 236 which is slidably received in a generally arrowheadshaped slot 238 formed in the free end 240 of plate 212. Essentially, the slot consists of a main straight portion 242 having a pair of side branches 244, 246 respectively, located at an intermediate portion of the slot 242 thereby to separate the slot into forward and rearward portions 242A and 242B respectively, as illustrated in FIG. 6. The ends of the branches 244, 246 define stops or stop edges 248, 250 respectively, which serve to limit pivot movement of lever 190 in the manner described hereinafter.

Control mechanism 210 also includes a cam member 252 having a generally triangular peripheral cam surface configuration, which is mounted eccentrically on a shaft 254 that in turn is rotatably mounted in any convenient manner in the support bracket 192. This cam member serves to oscillate lever 190 about its pivot axis, as described hereinafter. A spur gear 256 is integrally formed with shaft 254 and is in engagement with an auxiliary spur gear 258 which is also rotatably mounted in bracket 192. A pulley 260 is integrally formed above gear 258 and has a grooved periphery which receives a belt 262. The latter is connected to a grooved pulley 264 formed on the lower surface of flywheel 102, so that during operation of the device, while the drive motor 94 is in operation, pulley 260, gears 258, 256 and thus cam member 252 are continuously rotated.

During rotation of reel support member 23, for example in the play mode of operation of the apparatus illustrated in FIG. 4, i.e. with the reel support member 23 rotating in a counterclockwise direction, the frictional coupling of the plate 212 with the reel support member, by means of the friction ring 226, causes the plate to be urged angularly towards one side of the centered position thereof shown in FIG. 4. That is, the plate 212 tends to rotate in a counterclockwise direction with the reel support member 23, (towards the top of the drawings in FIGS. 1, 4 and 7A) so that the edge 266 of the slot 242 is engaged with the pin 236 of lever 190. Simultaneously, the cam member 252, which rotates in a generally clockwise direction, as indicated by the arrows in the drawings, engages the lever 190 adjacent pin 236 to alternately pivot the lever against the bias of springs 202 and 196 and free the lever for return to its first position illustrated in FIGS. 7C and 7B, under the influence of those springs. However, as long as the reel support member 23 is rotating in its counterclockwise direction, holding pin 236 against the edge 266 of slot 242 (the lower edge of the slot in FIGS. 7A–7D), the pin 236 will enter the branch 244 of the slot and engage the end stop shoulder 248 thereof. This stop is located to limit the pivotal motion of lever 190 under the influence of springs 202, 196, towards control member 170, to an intermediate position wherein the end 198 thereof is adjacent to the end 200 of control member 170 but does not become engaged therewith (i.e. the position in FIG. 7A).

Following the sequence of operation of the elements during rotation of the reel support member 23 in a counterclockwise direction, as illustrated in FIGS. 4 and 7A–7D (for example in the play or fast forward modes), and starting initially with the position illustrated in FIG. 4, it will be seen that in that position during the rotation of reel support member 23 the lever 190, once during every revolution of cam member 252, is moved to an extreme position in a clockwise direction as the apex 268 of the cam engages the arm 234 thereof, so that the end 198 of the lever is moved to its furthest position away from the end 200 of control member 170, against the bias of springs 196, 202. In this position the pin 236 of the lever 190 enters the forward portion 242A of slot 242 and thus prevents rotation of the plate 212 with the reel support member 23, causing the friction ring 218 to slip beneath the reel support member.

As the cam 252 continues to rotate from the position illustrated in FIG. 4, through approximately 145° to the positionn illustrated in FIG. 7 A, it allows the lever 190 to pivot in a counterclockwise direction as indicated by the arrow in FIG. 7A, under the influence of springs 196 and 202. As the pin 236 moves out of the forward portion 242A of the slot, it moves along slot edge 266 and encounters the branch 244 thereof. Since the friction disc 216 tends to make plate 212 move with reel support member 23 the edge 266 of the slot is held against the pin 236 so that the pin enters the branch 244 and ultimately becomes engaged with the stop end 248 thereof. The engagement of the pin 236 with stop 248 prevents further movement of the plate 212 with reel support member 23 and the clutch or friction ring 218 slips with respect to that reel support member. Additionally, this engagement of the pin with the stop prevents further rotation of lever 190 towards the control member 170, and holds the lever against spring 196, 202 in the intermediate position thereof shown in FIG. 7A. This occurs even though continued rotation of the cam 252 presenting the flat face 255 thereof to lever 190 (as in FIG. 7C) would allow continued rotation of lever 190 under the influence of springs 196 and 202 in the absence of stop 248.

At this point, assume that the tape in the cassette 13 has now been fully wound on the take up reel 16 therein, that reel being coupled to the shaft 23A of the reel support member 23. The tension in the tape between the reels 16 and 17, will prevent further rotation of those reels, so that the rotation of reel support member 23 is stopped and the friction wheel 116 of the main drive flywheel 104 will simply rotate or slip against the periphery 136 of the reel support member but will not drive that member. However, the operation of motor 94 continues to rotate the flywheels 104 and 102, thereby continuously driving or rotating the cam member 252. Thus, although the rotation of reel support member 23 is stopped, the cam 252 continues to rotate from the position thereof illustrated in FIG. 7A to the position illustrated in FIG. 7B wherein its apex 268 again engages the end 234 of lever 190, returning it to its extreme position away from control member 170 at which the pin 236 enters the end portion 242A of the slot in plate 212. The movement of the pin along the edge 266 of the slot branch 244 into the end 242A thereof causes the plate 214 to move from its off centered position illustrated in FIG. 7A to its centered position illustrated in FIG. 7B. At this point, although the cam member 252 continues to rotate under the influence of the drive to flywheel 102, plate 212 is not rotated through its frictional coupling to reel support member 23 since the reel support member is stopped. Accordingly, the plate remains in its centered position as the cam member 252 rotates another half revolution from the position illustrated in FIG. 7B to the position illustrated in FIG. 7C. As a result, the pivotal movement of lever 190 under the influence of springs 202 and 196, causes the pin 236 to enter the rear slot portion 242B of the slot 242, bypassing the slot branch 244 and stop shoulder 248. It will be apparent therefore that the lever 190 passes through its intermediate position (of FIG. 7A) and to its first position wherein the end 198 thereof engages the end 200 of control member 170 and, under the influence of springs 196, 202, causes the control member 170 to pivot about its pivotal mounting 164.

As previously described, due to the interconnection of the latch release control member 170 and the latch release member 162, by means of the spring 172, the movement of control member 170 from the position shown in FIGS. 7A and 7B to the position shown in FIG. 7C causes the latch release member 162 to move therewith. When the position of FIG. 7C is obtained, the gear 180 is engaged with gear 188 and, as previously described, this causes rotation of gear 182 to move the gear segment 184 in a counterclockwise direction as seen in FIG. 7D so that the latch release member 162 pivots about pivot 164 (FIG. 7D) to engage the abutment end 166 thereof with the leg 168 of latch member 48, causing the latter to pivot to its dotted line position in FIG. 5 releasing any pushbutton control member then in its operative position. This causes plate 138 to move to its outer position under the influence of spring 144, thereby opening contacts 150 and shutting off motor 94. With the drive thus shut off, latch release member 162 returns to its normal configuration with respect to control member 170 under the action of spring 172.

It is noted that the latch release member 162 can have a link 270 secured thereto in any convenient manner, so that upon pivotal motion of the latch release member, the link will operate a switch (not shown) for turning on a radio accompanying the tape recording and reproducing apparatus.

Although the shutoff mechanism 160 previously described has been discussed in detail with respect to the play mode of operation of the apparatus, it will be appreciated that in the fast forward mode of operation the shutoff mechanism will act in the identical manner. That is, in the fast forward mode as previously described, the idler wheel 120 is engaged with the idler wheel 114 to transmit motion from the main drive flywheel 104 to the friction wheel 126 of the reel support member 23, thereby causing the reel support member to rotate in a counterclockwise direction to wind tape on the take up reel of the cassette coupled therewith. During rotation of the reel support member 23 in this manner, the cam 252 is rotated, as previously discussed, to oscillate the lever 190. The counterclockwise rotation of the reel support member tends to move the plate 212 from its centered position shown in FIGS. 4 and 7B to its off centered position shown in FIG. 7A, keeping the guide pin 236 engaged with the edge 266 thereof so that during each revolution of the reel support member the pin is engaged with the stop 248. When the rotation of reel support member 23 stops because of complete winding of tape on the take up reel coupled therewith, the drive of the idler wheel slips against the stopped reel support member while the drive from motor 94 continues to operated, as previously described, to rotate the cam member 252, driving the lever 190 to the position shown in FIG. 7B, thereby returning the plate 212 to its centered position. In this position, continued rotation of cam 252 allows the lever to return to its first position, illustrated in FIG. 7C, wherein it causes pivotal movement of the control member 170. Such motion engages the gears 180, 188 which ultimately causes rotation of the latch release member 162 to release latch 48, as shown in FIG. 7D.

In the rewind mode of operation of the apparatus, the shutoff mechanism 160 operates in substantially the identical manner as described with respect to the play and fast forward modes. In the rewind mode however the reel support member 23 is rotated in a clockwise direction, as illustrated by the dotted arrows in FIGS. 3, 4 and 7A due to the pull on the tape reel coupled therewith as the result of the counterclockwise drive to the reel support member 24, as previously described with respect to FIG. 3. In this mode of operation, the clockwise motion of the reel support member 23 tends to drive plate 212 in a clockwise direction from its centered position shown in FIG. 4 to an off centered position shown in FIG. 3, due to the frictional coupling between the plate and the reel support member as a result of the friction ring 218. This motion keeps the pin 236 engaged against the edge 272 of slot 242 (the upper edge in FIGS. 7A–7C), thus the pin limits rotation of the plate 212 in the clockwise direction and causes the friction coupling to slip when the extreme off centered position of FIG. 3 is reached.

At the position shown in FIG. 3, the pin 236 engages the stop shoulder 250 of the other branch 246 of slot 242. This stop acts in the same manner as the previously described stop 248 to limit movement of the lever 190 under the influence of springs 196 and 202 to the intermediate position of the lever shown in FIG. 7A. For illustrative purposes, the pin 236 has been shown in dotted lines in FIG. 7A against the shoulder 250, to illustrate the corresponding position of the pin when the reel support member 23 is rotating in the rewind mode. Accordingly, plate 212 serves in the manner previously described to limit oscillation of the lever 190 during rotation of reel support member 23 to the positions shown in FIGS. 4 and 7A. When the rotation of reel support member 23 stops, in the rewind mode of the apparatus, due to full winding of tape on supply reel 17, idler wheel 114 slips with respect to the periphery of reel support member 24 while the drive of motor 94 continues, thereby rotating cam 252, as described above. Accordingly, the continued movement of the pin 236 against the edge 272 of slot 242 causes the off centered plate 212 to return to its centered position shown in FIG. 7B. At that point, the cam 252 is still continuing to rotate, until it reaches the position shown in FIG. 7C, allowing lever 190 to return to its initial position (shown in FIG. 7C) under the influence of springs 196, 202 to shut off the apparatus in the manner previously described, by operating the control member 170.

Accordingly, it will be appreciated that a relatively simply constructed and compact apparatus is provided which will automatically shut off the operation of the magnetic tape recording and reproducing apparatus 10 upon full winding of the tape in a cassette coupled to the apparatus, on one of the reels thereof.

In accordance with another feature of the present invention, the apparatus 10 is provided with a shutoff control assembly 280 which prevents operation of the shutoff assembly 160 during a particular mode of operation of the apparatus; more specifically, the assembly 280 (FIGS. 3 and 8) prevents the apparatus from being shut off when, in the play mode of the apparatus, the rewind button is pushed to allow review of signals on tape which had previously passed the recording head 90 and was wound on the reel 16 coupled to reel support member 23, even when the rewinding of the tape in this mode fully rewinds the tape onto the take up reel 17 coupled with reel support member 24.

As previously mentioned, the play mode of the apparatus is illustrated in FIG. 8 of the drawing, wherein it is seen that the latch member 48 holds the play pushbutton 32 in its operative position. The drive arrangement shown in FIG. 8 is exactly the same as it would be if the record button 36 was simultaneously depressed for recording purposes. During the play mode, or during the record mode, when it is desired to review signals on the tape which has already passed head 90, the operator can cause the device to rewind tape onto the reel coupled with reel support member 24 simply by depressing the rewind button 28 while the play button is in its operative position. In order to effect the rewind of tape during the play mode, a lever 282 is mounted on the undersurface of chassis plate 42, which lever has a free end 284 formed as an upbend tab extending through a slot (not shown) in chassis plate 42 and engaged in a recess 286 formed in an edge of the carriage 68. The opposite end 288 of lever 282 is located adjacent a pin 290 which extends downwardly from the actuator bar 28' of pushbutton 28 through a slot (not shown) in chassis plate 42. When the rewind button is depressed during the play mode of the apparatus, as illustrated in FIG. 8, wherein carriage 68 is located to engage pinch roller 80 with capstan 21 and to insert the pin 128 thereon in the notch 132 of lever 106, pin 290 will engage the end 288 of lever 282 and rotate the lever in a clockwise direction about its pivot point 292. This rotation causes tab 284 to engage the end 294 (FIG. 3) of slot 286 and push the carriage 68 rearwardly, against the bias of spring 74 (to the dotted line position shown in FIG. 8). This rearward movement of carriage 68 causes two distinct movements in the drive transmission. First, pin 128 is causes to move along the inclined surface 294 of notch 132 a predetermined distance, but does not move out of the notch. This engagement however causes the lever 106 to pivot slightly in a clockwise direction, thereby disengaging the friction wheel 134 from the periphery 136 of reel support member 23, stopping the drive to that reel support member. In addition, the rearward movement of the carriage disengages the front edge 296 of the carriage from the end 298 of lever 118. As a result, (and as described in said above mentioned co-pending application) the lever 118 is moved under the influence of a spring 300, downwardly to engage idler wheel 114 with friction wheel 116 and the periphery of reel support member 24, thereby to drive the reel support member in a clockwise direction as indicated by the dotted arrow 302 in FIG. 8. This causes the tape previously wound on the reel coupled to reel support member 23 to be rewound onto the cassette reel coupled with reel support member 24. When the review pushbutton 28 is manually released, the lever 282 is also released so that the carriage 68 can return to its original position shown in solid lines in FIG. 8 under the influence of spring 74.

In this connection it is noted that the latch member 58 of the play pushbutton 32 is made somewhat longer than the latch of review button 28 so that in the play mode of operation the latch member 48 is pivoted downwardly to a greater extent than it is in the review mode. As a result, when the device is in the play mode, depression of the review pushbutton will not cause the latch member 58 of the review button to become engaged with its associated keeper 56 on the latch 48.

The shutoff control mechanism 280 shown in FIGS. 3 and 8 advantageously utilizes the movement of carriage 68 during this review mode of operation of the apparatus in order to prevent shutoff of the devide should all the tape previously wound on the cassette reel coupled with reel support member 23 be rewound onto the cassette reel coupled with reel support member 24. Essentially, the shutoff control mechanism 280 consists of a lever 304 which is pivotally mounted on a pivot pin 306 on a support bar 308 which is rigidly secured at its end 310 on the upper surface of the actuator bar 32' of the play button 32 and which extends over the actuator bar 34' of the fast forward pushbutton 34. The lever 304 includes one end 312 which overlies the rear end 294 of slot 286, for reasons more fully described hereinafter.

The opposite end 314 of lever 304 is engaged with an upstanding tab 316 formed on a one piece plate 318 that is slidably mounted on the upper surface of chassis plate 42 by means of a pair of pins 320, 322 extending through slots 320', 322' in the plate. Plate 318 is biased towards the front of the apparatus by a spring 324 which is engaged between the plate and the front flange 40 of chassis plate 42.

Plate 318 is utilized to control a drive lever 323 which is pivotally mounted on a tab 325 extending downwardly from chassin plate 42. The lever extends upwardly through a slot (FIG. 9) in chassis plate at 42, and is pivotally mounted on the chassis plate at 326, and is biased by a spring 328 for rotation in a clockwise direction as seen in FIG. 9. The lever 323 is positioned to selectively engage the nose portion 330 of the plate 212.

In the normal rewind mode of operation of the apparatus or in the fast forward mode of operation of the apparatus with carriage 68 in its retracted position shown in FIG. 3, the plate 318 is held by spring 324 in the position shown in FIG. 3 so that the lever 323 is held out of engagement with the nose 330 of plate 212 (as shown in solid lines in FIG. 9). In this mode of operation the lever 323 serves no function in the operation of the device.

In the normal play or record modes of operation, the carriage 68 moves to its solid line position in FIG. 8, carrying with it the lever 304 secured to the support bar 310. Lever 304 is bent downwardly slightly at the line 332 to form a shoulder which engages the end 334 of arm 310 to prevent clockwise rotation of the lever 304 beyond the position illustrated in FIG. 8. As a result, the engagement of the end 314 of the lever against tab 316 of plate 318 causes the plate 318 to move forwardly, against the bias of spring 324, with carriage 68 when the play button 32 is depressed, so that the plate 318 assumes the solid line position thereof shown in FIG. 8, and the center dotted line position shown in FIG. 9. In this position, the end 334 of plate 318 adjacent slot 322' holds lever 323 captured against the bias of spring 328 in a position wherein the lever does not interfere with the movement of plate 212 from its centered position shown in solid lines in FIGS. 4 and 8 to its off centered position shown in FIG. 7A or in dotted lines in FIG. 8. Thus, in the normal play or normal record modes of operation of the apparatus the lever 323 also serves no specific function in the apparatus.

However, when the rewind button 28 is pushed during the play or record modes of the apparatus, in order to permit review of signals on the tape previously wound on the cassette reel coupled with reel support member 23, the rearward movement of carriage 68 to its dotted line position shown in FIG. 8, as previously described, not only causes the apparatus to be driven in the rewind direction, but also causes the upturned tab 284 of lever 282 to engage the end 312 of lever 304, thereby pivoting the lever in a counterclockwise direction to the dotted line position thereof shown in FIG. 8. This pivotal movement of lever 304 causes plate 318 to move to its dotted line position in FIG. 8, because of the engagement between the end 314 of the lever and the tab 316. As this point, the lever 323 is urged into engagement with the nose 330 of plate 212, under the influence of spring 328.

As will be apparent, in this review mode of operation of the apparatus, the reel support member 23 will be rotated in a clockwise direction as indicated by the dotted arrow 336 in FIG. 8. As previously described when the reel support member 23 rotates in that direction the plate 212 tends to be driven through the friction ring 218 from its centered position to its off centered position shown in FIG. 3. However, because of the engagement of the lever 323 with the nose 330 of plate 212, the plate is blocked from such movement. In fact, the lever 323, under the influence of spring 328, biases the plate 212 to the off centered position thereof it would obtain if the reel support member 23 were being driven in a counterclockwise direction, as during the normal play mode. The bias of spring 328 on lever 323 is sufficient to overcome the drive from the reel support member 23 on plate 212 through the friction ring 218. However, the plate 212 is returned once during every revolution of the cam 282 to its centered position shown in solid lines in FIG. 8 due to the engagement of the pin 236 of lever 190 against the edge 266 of slot 242.

Now assuming that the apparatus is in the condition shown in FIG. 8, and that the rewind pushbutton 28 is depressed, to cause carriage 68 to move to its dotted line position in that Figure allowing rewind of tape onto the reel coupled with reel support member 24 for review, and further assume that all of the tape is rewound onto the reel coupled with support member 24 so that rotation of reel support member 23 is stopped or arrested; it will be apparent that in this mode of operation, even when the lever 190 is driven by cam 252 to the position shown in FIG. 7B of the drawing, it cannot return to its initial position shown in FIG. 7C, because as the lever 190 moves from the position of FIG. 7B towards its intermediate position of FIG. 7A, the lever 323 will urge the plate 212 from the centered position of FIG. 7B to the off centered position shown in dotted lines in FIG. 8. As a result the pin 236 of lever 190 remains engaged against the edge 266 of slot 242 and ultimately engages the stop 248 formed by the slot branch 244. Thus, the lever 190 is limited in its movement only to its intermediate position and the apparatus is not shut off. Accordingly the operator can then release the rewind pushbutton and the apparatus will return to the configuration thereof illustrated in solid lines in FIG. 8 to permit continued play or recording on the tape in the cassette coupled thereto. It will be appreciated therefore that in the review mode of the apparatus the lever 323 acts as a drive member, in lieu of the driving force provided by reel support member 23 in the other modes of the operation of the apparatus, in order to drive the plate 212 from its centered position to its off centered position. This drive of lever 323 remains irregardless of whether the reel support member 23 is rotating in a counterclockwise direction or is stopped. Thus the apparatus will not be automatically shut off during the review mode of operation. This is a highly desirable feature of the apparatus since an operator using the review mode of operation of the apparatus obviously does not want the apparatus to shut off during that mode since his obvious intention is to continue listening to, or recording, material on the tape.

Accordingly, it will be appreciated that by the present invention a magnetic tape recording and reproducing apparatus has been provided which not only allows for automatic shut off of the apparatus when rotation of the reel support members thereof is arrested upon full winding of tape of one of the cassette reels coupled therewith, but also prevents such shut off when such arresting of the reel support members occurs during the review mode of operation of the apparatus. Moreover, these features of the invention are achieved by a relatively simple structure requiring a minimum number of parts which are relatively inexpensive to manufacture and assemble. Further, the automatic shutoff device of the apparatus is operative in the desired manner without requiring an engagement of any part or element of the device with the magnetic tape, and thus does not adversely influence the movement of the tape during any of the modes of operation of the apparatus. It will also be seen that the automatic shutoff device 124 according to this invention is operative with any conventional magnetic tape in a cassette, or otherwise, and does not require the provision of either conductive or light transmitting leads at the ends of such tape. Further, since no part or element of the automatic shutoff device is engageable with the tape in a cassette, there is no need to provide the cassette housing with special openings for reception of a part of element of the shutoff device.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. An apparatus operable in a plurality of modes, including play, stop, and rewind modes, for recording and/or reproducing signals on a magnetic tape extending between first and second reels to which the ends of the tape are secured and on which the tape is wound, said apparatus comprising: first and second rotatable reel support members for rotational coupling with the first and second reels, respectively; drive means; drive control means to effect operation of said drive means to operate said apparatus in any of said modes; transmission means connected to said drive means and comprising a first member driven in one direction by said drive means and further comprising means to couple said first member selectively to either of said reel support members for selectively driving the selected reel support member to rotate in the direction for winding tape on the reel respectively coupled therewith in response to operation of said drive means and permitting continued operation of said drive means when rotation of said reel support members is arrested upon the full unwinding of the tape from the other of said reels, said transmission means including means responsive to the drive control means for rotating one of said reel support members in said play mode and for interrupting the play mode and rewinding tape onto the reel coupled with the other of said reel support members, thereby to permit review of signals on tape wound on the reel coupled with said one reel support member during said play mode; shutoff means coupled to said first member of said transmission means to be powered by said drive means and having a first condition for causing said drive control means to halt the operation of said drive means and a second condition in which said drive means is unaffected by said shutoff means; and shutoff control means connected with one of said reel support members for disposing said shutoff means in said second condition in response to rotation of said one reel support member and for disposing said shutoff means in said first condition in response to arresting of the rotation of said reel support members during continued operation of said drive means; and means responsive to said drive control means for preventing said shutoff control means from disposing the shutoff means in said first operative condition when said drive control means is actuated to cause said transmission means to rewind tape onto the reel coupled with the other of said reel support members during the play mode to permit signal review, whereby said tape can be fully rewound during the play mode without halting the operation of said drive means.

2. An apparatus operable in a plurality of modes, including play, stop, and rewind modes, for recording and/or reproducing signals on a magnetic tape extending between first and second reels to which the ends of the tape are secured and on which the tape is wound, said apparatus comprising: first and second rotatable reel support members for rotational coupling with the first and second reels respectively; drive means including an electric motor; drive control means including a switch having a normal inoperative condition and being actuable to an operative condition for energizing said motor and thereby effecting operation of said drive means; manually operable actuating means movable from a normal inoperative position to an operative position for actuating said switch means to said operative condition thereof; latch means for releasably holding said actuating means in said operative position thereof; transmission means connected to said drive means and responsive to said drive control means for driving a selected one of said reel support members to rotate in the direction for winding tape on the reel respectively coupled therewith and for permitting continued operation of said drive means when rotation of said reel support members is arrested upon the full unwinding of the tape from the other of said reels; shutoff means including latch release means displaceable to a predetermined extent for releasing said latch means; latch release operating means movable between a first inoperative position and a second operative position in operative driven engagement with said drive means to be driven by said drive means for displacing said latch release means to said predetermined extent only when the rotation of said reel support members is arrested during the continued operation of said drive means, and means for selectively moving said latch release operating means from its inoperative position to its operative position including a lever pivotally mounted in said apparatus and having one end positioned adjacent said latch release operating means; means for normally biasing said one end of said lever to a first position against said latch release operating means at which the latter is held in its operative position; means driven by said drive means for oscillating said lever, against the bias of said biasing means, between said first position thereof and a second position wherein said one end of the lever is out of engagement with said latch release operating means; and stop means operatively engaged with one of said reel support members for limiting oscillation of said lever, during rotation of said one reel support member, to movement between said second position of the lever and an intermediate position at which said one end of the lever is adjacent to but out of engagement with said latch release operating means and for releasing said lever for movement to its first position by said biasing means when rotation of said one reel support member is arrested thereby to move said latch release operating means to its second position for displacing said latch release means to said predetermined extent.

3. An apparatus according to claim 2 wherein said latch release operating means includes a gear rotatably mounted thereon for movement between said first and second positions of the latch release operating means wherein said gear, at said second position, is placed in operative driven engagement with said drive means for rotation thereby; and said latch release means comprises a second lever pivotally mounted in said apparatus and having a sector shaped gear segment formed thereon engaged with said gear, whereby rotation of said gear causes movement of said gear segment with respect to the gear, thereby to displace said latch release menas to said predetermined extent.

4. An apparatus as defined in claim 3 wherein said latch release operating means comprises a third lever pivotally mounted in said apparatus and having said gear rotatably mounted thereon, said second lever being rotatably mounted on said third lever for movement therewith between said first and second positions of the latch release operating means and for independent pivotal movement upon rotation of said gear by said drive means.

5. An apparatus as defined in claim 4 including resilient means for normally maintaining said second and third levers in a relatively fixed position with respect to each other and for allowing rotation of said third lever with respect to said second lever by said gear.

6. An apparatus as defined in claim 4 wherein said manually operable actuating means includes a plurality of operating mode selecting members individually movable between respective normal inoperative and operative positions; and said latch means includes a latch member common to all of said mode selecting members and having keepers for at least certain mode selecting members, a latch element extending from each of said certain mode selecting members and being engageable with the respective keeper of said latch member when the respective mode selecting member is moved to its operative position; means for mounting said latch member for movement between a latching position for receiving the latch elements of said mode selecting menbers in the respective keepers and a released position in which said latch elements are freed from their respective keepers; and means for urging said latch member to said latching position; said latch release means moving said latch member to said released position upon the displacement of said latch release means to said predetermined extent.

7. An apparatus as defined in claim 6 wherein said mounting means mounts said latch means for pivotal movement, and said latch release means includes abutment means engaging said latch means for pivoting the latch means against the bias of said urging means to said released position upon actuation of said gear.

8. An apparatus according to claim 2 including an elongated plate pivotally mounted in said apparatus for swinging movement to either side of a centered position; said plate having an elongated slot formed therein including a pair of opposed end sections and a pair of angularly related outwardly extending branches located at an intermediate position along said slot between said end sections; said lever having an abutment member formed thereon and slidably received in said slot, and said stop means being defined by the outer extremities of said branches; and rotational transmission means operatively connected between said one reel support member and said plate for frictionally urging said plate to the side of said centered position in the direction of rotation of said one reel support member, thereby to maintain said abutment member in engagement with the trailing edge of said slot with respect to the direction of rotation of the one reel support member, whereby during rotation of said one reel support member said abutment member oscillates in said slot between the outer extremity of one of said branches at an off centered position of said plate and one of the opposed ends of the slot at the centered position of the plate as said lever oscillates between said intermediate and second positions thereof respectively; said abutment member operating to return said plate to its centered position against the bias of said rotational transmission means as the lever oscillates from said intermediate position to said second position, by its engagement with the edge of the slot at said one opposed end thereof; said plate, upon arresting of rotation of said one reel support member, remaining stationary after having been moved to its centered position by oscillation of said abutment member, thereby allowing said abutment member to enter the other opposed end section of the slot, past said slot branches, to permit said lever to move its first position under the bias of said biasing means.

9. An apparatus as defined in claim 8 wherein said oscillating means comprises a cam member driven by said drive means and having a peripheral cam surface engaged with said lever for oscillating the latter; said cam surface having a predetermined configuration selected to urge said lever from said second to said intermediate positions thereof while allowing substantially free movement of said lever from said second to said first position thereof.

10. An apparatus as defined in claim 2 wherein said manually operable actuating means includes a plurality of operating mode selecting members and said transmission means includes means responsive to the operation of the mode selecting members for rotating one of said reel support members in a play mode and for interrupting the play mode and rewinding the tape onto the other of said reel support members, thereby to permit review of signals on tape wound on the reel coupled with said one reel support member during said play mode; and means responsive to said drive control means for preventing movement of said latch release means to said predetermined extent when said mode selecting members are actuated to cause said transmission means to rewind tape onto the tape reel coupled with the other of said reel support members during a previously selected play mode, whereby said tape can be fully rewound during the play mode without halting the operation of said drive means.

11. An apparatus as defined in claim 9 wherein said manually operable actuating means includes a plurality of operating mode selecting members and said transmission means includes means responsive to the operation of the mode selecting members for rotating one of said reel support members in a play mode and for interrupting the play mode and rewinding the tape onto the other of said reel support members, thereby to permit review of signals on tape wound on the reel coupled with said one reel support member during said play mode; and means responsive to said drive control means for moving said plate from its centered position to one of its off centered positions when rotation of its associated reel member is arrested after actuation of said mode selecting members to cause said transmission means to rewind tape onto the tape reel coupled with the other of said reel support members during a previously selected play mode whereby movement of said abutment member, in this mode of the apparatus, is restricted between said one opposed end section of the slot and one of said branches, to limit oscillation of said lever to movement between said second and intermediate positions thereof.

12. An apparatus as defined in claim 11 wherein said plate includes an extension tongue and said plate moving means comprises an auxiliary lever pivotally mounted in said apparatus in engagement with said tongue and resilient means for biasing said auxiliary lever into engagement with said tongue to pivot said plate from its centered position to said one of its off-centered positions.

13. An apparatus as defined in claim 12 including means operatively connected to said mode selecting members for holding said auxiliary lever out of engagement with said tongue in all operating modes of the apparatus except during interruption of the play mode for rewinding of the tape to permit review of signals thereon.

* * * * *